(12) United States Patent
Nishiwaki

(10) Patent No.: US 7,287,714 B2
(45) Date of Patent: Oct. 30, 2007

(54) TAPE CARTRIDGE

(75) Inventor: Toshiro Nishiwaki, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 385 days.

(21) Appl. No.: 11/100,571

(22) Filed: Apr. 7, 2005

(65) Prior Publication Data

US 2006/0163405 A1    Jul. 27, 2006

(30) Foreign Application Priority Data

Apr. 9, 2004   (JP)   ............................. 2004-115005

(51) Int. Cl.
*G11B 23/087*    (2006.01)
(52) U.S. Cl. ...................... 242/341; 360/132
(58) Field of Classification Search ............... 242/341; 360/132
See application file for complete search history.

(56) References Cited

FOREIGN PATENT DOCUMENTS

| | | |
|---|---|---|
| JP | 5-334843 A | 12/1993 |
| JP | 6-195930 A | 7/1994 |
| JP | 2002-25218 A | 1/2002 |

*Primary Examiner*—John Q. Nguyen
(74) *Attorney, Agent, or Firm*—Birch, Stewart, Kolasch & Birch, LLP

(57) ABSTRACT

A tape supply-side hub, a tape take-up-side hub and a magnetic tape wound onto the tape supply-side hub are included inside a mainframe case. A leader tape fixed onto the tape take-up-side hub and one end of the magnetic tape are connected via a splicing tape. The other end of the magnetic tape is wound onto the tape supply-side hub, and the magnetic tape and the tape supply-side hub are directly connected with adhesive agents. A wound tape layer wounded onto the tape supply-side hub in the fully wound state is composed of a non-recording layer on the winding leader side composed of a specified amount of the wound tape layer and a recording layer continuing to the non-recording layer. The feeding limit position of the magnetic tape in the tape supply-side hub is set to be in the vicinity of a boundary between the non-recording layer and the recording layer.

3 Claims, 2 Drawing Sheets

TAPE CARTRIDGE

BACKGROUND OF THE INVENTION

The present invention relates to a tape cartridge for use as a backup medium for computer data, and more particularly relates to a two-reel-type tape cartridge (DDS series) including a tape supply-side hub and a tape take-up-side hub placed inside a mainframe case.

In the two-reel-type tape cartridge, respective end portions of the magnetic tapes are connected to hubs through leader tapes. In most cases, the magnetic tape and the leader tape are connected via a splicing tape, and the winding leader of the leader tape is fixed by a tape clamp mounted on the peripheral face of the hub. In such conventional tape connection structure, it is inevitable to have slight steps in a mounting portion of the tape clamp and in a bonding portion of the splicing tape. The shapes of these steps are transferred to the magnetic tape and thereby deforms the magnetic tape, which contributes to occurrence of dropout at the time of read/write access to recording signals.

In order to prevent such transfer of shapes to the magnetic tape, it has been proposed to directly connect the winding leader of the magnetic tape or the leader tape to the hub without use of the tape clamp and the splicing tape. For example, in Japanese Patent Publication No 2002-25218 A (particularly seeing paragraph No. 0022 and FIG. 6), a cylinder-shaped buffering portion is formed around the peripheral face of the hub, and a leader tape is bonded to the peripheral face via adhesive agents. In Japanese Patent Publication No. H06-195930 A (particularly seeing paragraph No. 0011 and FIG. 1), a magnetic tape end on which adhesive agents were applied in advance is bonded to the peripheral face of the hub, and further the tape end is bonded to a leader portion of the magnetic tape. In Japanese Patent Publication No. H05-334843 A (particularly seeing paragraph No. 0008 and FIG. 1), the winding leader of a leader tape is directly bonded to the hub.

In Japanese Patent Publications Nos. 2002-25218 A and H05-334843 A, the leader tape is bonded to the hub directly or through a buffering portion, which makes it possible to prevent shapes from being transferred when the tape end is secured with use of a tape clamp. However, it is necessary to connect the leader tape and the magnetic tape through the splicing tape, which makes it impossible to prevent the transfer of shapes caused by a step by a thickness of the splicing tape. Contrary to this, in Japanese Patent Publication No. H06-195930 A, the magnetic tape is directly bonded to the hub, thereby making it possible to avoid an influence by the splicing tape. However, a large tape tension acts on the magnetic tape in the state that the magnetic tape is all fed, which causes a problem with durability in long-term use. In addition, the tape end is bonded and fixed to the leader portion of the magnetic tape, and therefore it is unavoidable for the winding leader to have a step by the thickness of the tape.

While the tape cartridge as the object of the present invention has a signal recording density and a read/write speed (data transfer rate) for recording signals remarkably higher than those of general tape cartridges, enhancement in computer hard disc capacity has been promoting a demand for tape systems offering read/write access to a larger amount of backup data at a higher speed as well as tape cartridges supporting the tape systems. In such high-speed and high-density tape cartridges, a base tape is thinned to enhance a recording capacity, which fosters tendency toward transfer of shapes. Consequently, how to eliminate the dropout associated with the transfer of shapes is an issue to be solved.

SUMMARY OF THE INVENTION

An object of the present invention is to provide a high-speed and high-density tape cartridge which optimizes the connection structure between the magnetic tape and the hub, sweeps away the dropout of recording signals associated with transfer of shapes, and which is suitable as a backup medium for computer data.

A tape cartridge of the present invention, which is composed of a tape supply-side hub 2, a tape take-up-side hub 3 and a magnetic tape 4 wound onto the tape supply-side hub 2 that are placed inside a mainframe case 1, is used as a backup medium for computer data. A leader tape 14 fixed onto the tape take-up-side hub 3 and one end of the magnetic tape 4 are connected via a splicing tape 15. The other end of the magnetic tape 4 is wound onto the tape supply-side hub 2 so as to directly connect the magnetic tape 4 and the tape supply-side hub 2. A wound tape layer wounded onto the tape supply-side hub 2 is composed of a non-recording layer M1 on the winding leader side composed of a specified amount of the wound tape layer and a recording layer M2 continuing to the non-recording layer M1. The feeding limit position of the magnetic tape 4 in the tape supply-side hub 2 is set to be in the vicinity of a boundary between the non-recording layer M1 and the recording layer M2.

The end portion of the magnetic tape 4 can be bonded to the peripheral face of the tape supply-side hub 2 through either water or adhesive agents 17.

The non-recording layer M1 may be composed of an amount of the magnetic tape 4 which allows a wound posture to be maintained by a friction resistance between adjacent tape faces.

In the present invention, the one end of the magnetic tape 4 and the tape take-up-side hub 3 are connected via the leader tape 14 while the other end of the magnetic tape 4 is connected to the tape supply-side hub 2 in the state of being directly wound onto the tape supply-side hub 2. In this state, the wound tape layer wound onto the tape supply-side hub 2 is constituted of a non-recording layer M1 on the winding leader side composed of a specified winding amount of magnetic tape 4 and a recording layer M2 continuing to the non-recording layer M1, and the feeding limit position of the magnetic tape 4 in the tape supply-side hub 2 is set to be in the vicinity of a boundary between the non-recording layer M1 and the recording layer M2. Thus, while the end portion of the magnetic tape 4 directly wound onto the tape supply-side hub 2 causes a step by a thickness of the magnetic tape 4 at the winding leader, a step size can be drastically decreased compared to the case where, for example, a tape clamp 13 is used to secure the magnetic tape 4. Moreover, the step is absorbed by the non-recoding layer M1 wound onto the tape supply-side hub 2, and on the outermost perimeter of the non-recoding layer M1, the step is reshaped to a negligible level. Therefore, by providing the non-recoding layer M1 including an amount of the wound tape layer which allows the step to be reshaped, it becomes possible to suppress the transfer of shapes associated with the step corresponding to the thickness of the winding leader of the magnetic tape 4 and to sweep away the dropout of recording signals associated with the transfer of shapes so as to obtain a high-speed and high-density tape cartridge suitable as a backup medium for computer data.

The backup data is recorded only onto the recording layer M2 and at the point of time when all the recording layer M2 was fed, supplying of the tape is stopped so that the non-recoding layer M1 is constantly left on the supply-side hub 2. As a result, while the magnetic tape 4 is simply wound onto the supply-side hub 2, it becomes possible to reliably prevent the magnetic tape 4 from being separated from the supply-side hub 2 in the state that all the recording layer M2 was fed, thereby allowing reliable rewinding of the magnetic tape 4.

By bonding the end portion of the magnetic tape 4 to the peripheral face of the tape supply-side hub 2 through either water or the adhesive agents 17 and winding the end portion of the magnetic tape 4 in this state, the winding operation of the magnetic tape 4 can be simplified as well as the tape connection structure can be simplified by omission of the tape clamp or its mounting recess portion. Since the peripheral face shape of the hub 2 onto which the magnetic tape 4 is wound may be formed into a seamless circle, it becomes possible to methodically wind the magnetic tape 4 onto the hub 2 to surely prevent dropout of information signals in the recording layer M2.

By constituting the non-recoding layer M1 from an amount of the magnetic tape 4 which allows the wound posture to be maintained by a friction resistance between adjacent tape faces, it becomes possible to prevent the non-recoding layer M1 from going slack and being separated from the hub 2 even in the case where the tape cartridge is injected from a tape drive due to failures of the tape drive and the like in the state that all the amount of the recording layer M2 was fed.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
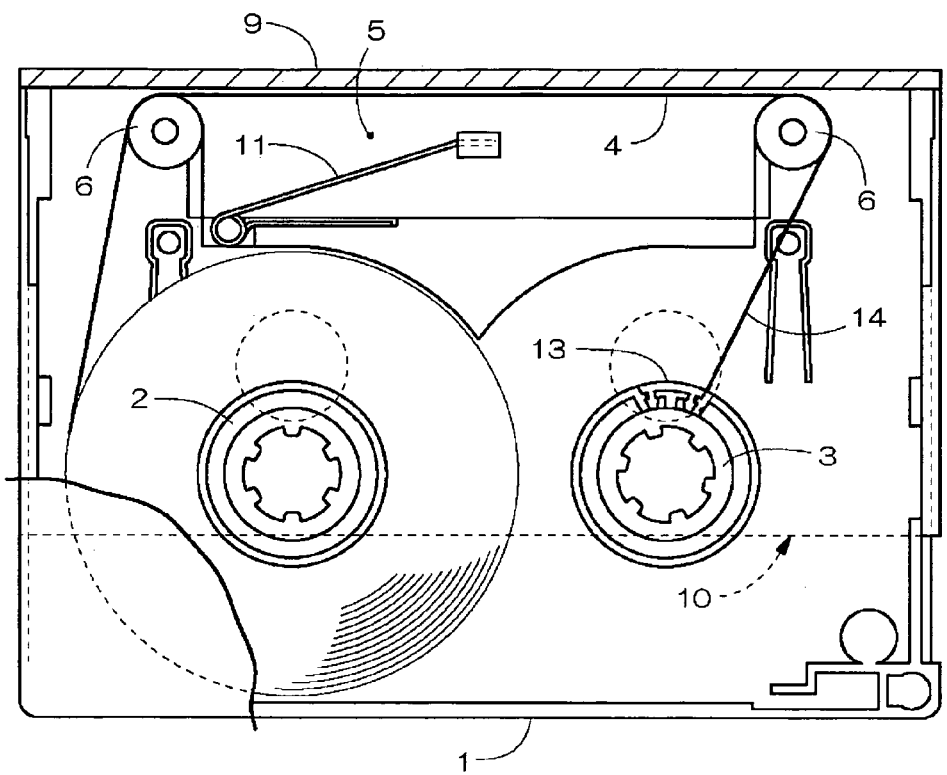
FIG. 1 is an inner plane view showing the schematic structure of a tape cartridge.
Figure 2:
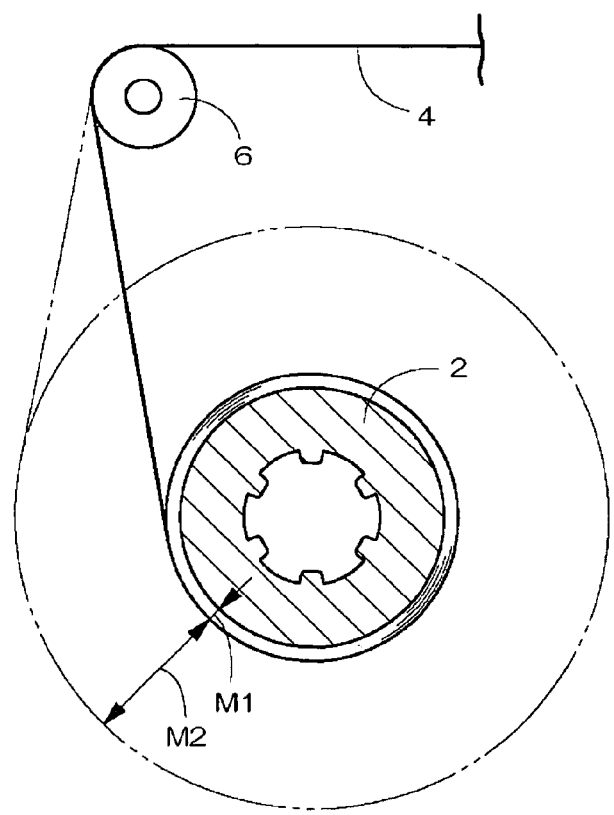
FIG. 2 is a plane view showing the structure of a wound tape layer.
Figure 3:
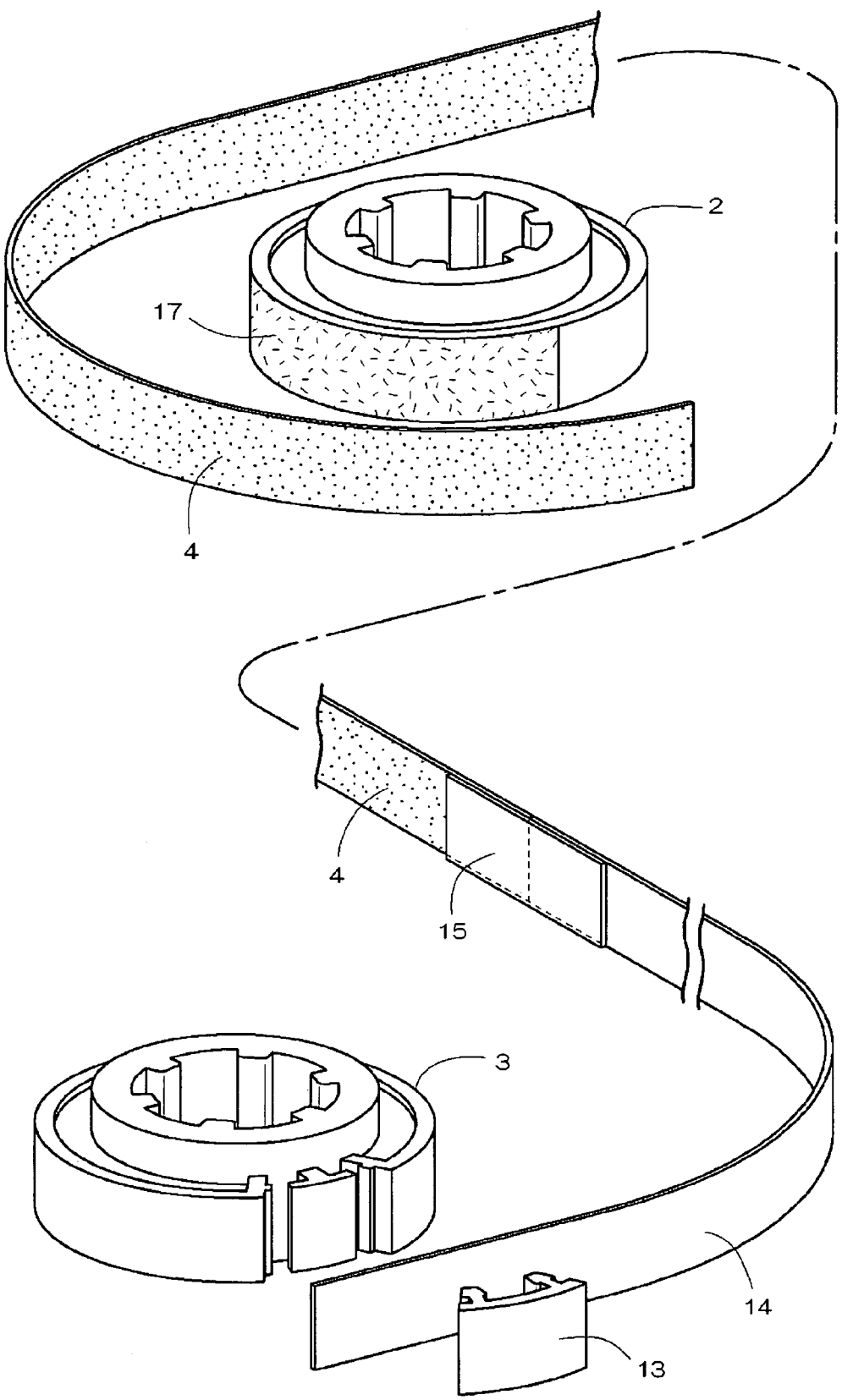
FIG. 3 is a exploded perspective view showing the connection structure between a magnetic tape and a hub.

FIGS. 1-3 show the embodiment of a tape cartridge according to the present invention. In FIG. 1, the tape cartridge is composed of a tape supply-side hub 2 and a tape take-up-side hub 3 disposed on the left-hand and right-hand portions inside a mainframe case 1, and is capable of recording information signals by feeding the magnetic tape 4 wound onto the tape supply-side hub 2 to the tape take-up-side hub 3. A tape loading pocket 5 is provided on the front portion of the mainframe case 1. The magnetic tape 4 fed from the tape supply-side hub 2 is fed to the tape take-up-side hub 3 via tape guides 6, 6 disposed on both the sides of the pocket 5.

The tape loading pocket 5 can be opened and closed by rocking a front cover 9 and can also be opened and closed by sliding a shutter 10 disposed on the lower face side of the mainframe case 1. Reference numeral 11 denotes a spring for closing the shutter 10 by automatically applying a biased sliding force. The front cover 9 and the shutter 10 are opened by charging the tape drive with a tape cartridge, and in such a case, an unshown hub locking mechanism is unlocked and the mode of the tape cartridge is switched to the mode in which both the hubs 2, 3 are rotatable.

The magnetic tape 4 and each of the hubs 2, 3 are connected as follows. In FIG. 3, with a tape clamp 13 which is engaged with the tape take-up-side hub 3, one end of a transparent leader tape 14 is fixed onto the hub 3 while the other end of the leader tape 14 is connected to the magnetic tape 4 with a splicing tape 15. The other end of the magnetic tape 4 is directly wound onto the tape supply-side hub 2. More specifically, adhesive agents 17 are applied in advance to the peripheral face of the tape supply-side hub 2, and the end portion of the magnetic tape 4 is wound around the peripheral face of the tape supply-side hub 2 and bonded and fixed thereto. It is to be noted in the manufacturing process of the tape cartridge, the supply-side hub 2 with the magnetic tape 4 wound thereto and the take-up-side hub 3 with the leader tape 14 fixed thereto are incorporated in the mainframe case 1, and then the feeding end of the magnetic tape 4 is connected to the leader tape 14 with the splicing tape 15.

As described above, when the end portion of the magnetic tape 4 is directly bonded to the peripheral face of the tape supply-side hub 2, a step is generated by the thickness of the magnetic tape 4 at the winding leader but a step size can be drastically decreased compared to the case where, for example, a tape clamp 13 is used to secure the magnetic tape 4. Once the magnetic tape 4 is wound a few times on the tape supply-side hub 2, the step is reshaped to a negligible level, and therefore by setting a later-described non-recoding layer M1 so as to include a reshaped portion, it becomes possible to sweep away the problem of the transfer of shapes associated with the step.

The magnetic tape 4 in the normal state is stored in the state of being wound onto the tape supply-side hub 2. For example, in the case of backing up the data recorded on the hard disc, information signals are recorded while the magnetic tape 4 is being wound onto the take-up-side hub 3. When recording of the signals is finished, the magnetic tape 4 is rewound back onto the tape supply-side hub 2 and stored in this state. In this case, if all the magnetic tape 4 wound onto the tape supply-side hub 2 is fed, the end portion of the magnetic tape 4 is possibly separated from the hub 2 and wound onto the take-up-side hub 3.

In order to avoid such an incident, in the present invention, the wound tape layer in the fully wound state is constituted of, as shown in FIG. 2, a non-recoding layer M1 on the leader side composed of a specified amount of a wound tape layer and a recording layer M2 continuing to the non-recoding layer M1, and the feeding limit position of the magnetic tape 4 in the tape supply-side hub 2 is set to be in the vicinity of the boundary between the non-recoding layer M1 and the recording layer M2. More particularly, once the recording layer M2 in the fully wound state is all fed, the feeding of the tape is stopped so that the non-recoding layer M1 is constantly left on the supply-side hub 2. Naturally, the backup data is recorded only onto the recording layer M2. The end of feeding of the recording layer M2 is determined by the side of the tape drive. For example, the completion of the feeding of the recording layer M2 is determined by counting the number of rotation of either one of the hubs (2 and 3) from the start of recording or by directly detecting the feeding amount of the magnetic tape 4, which is fed at a constant rate, with use of a sensor provided on the tape drive.

The length of the magnetic tape 4 forming the non-recoding layer M1 is shorter the better as it is economical, though as described before, the length has only to be in the range at least capable of reshaping the step at the leader of the magnetic tape 4. More preferably, the magnetic tape 4 forming the non-recoding layer M1 should be formed from an amount of the magnetic tape 4 which allows the wound posture to be maintained by a friction resistance between adjacent tape faces of the magnetic tape 4 wound onto the hub 2.

According to the above-structured tape cartridge, an influence of the step corresponding to a thickness portion of the magnetic tape 4 can be absorbed and removed by the non-recoding layer M1, so that the dropout of recording signals associated with the transfer of shapes may be swept away. Therefore, it becomes possible to obtain a high-speed and high-density tape cartridge suitable as a backup medium for computer data.

As an alternative of the above embodiment, instead of the adhesive agents 17, water may be applied to the peripheral face of the tape supply-side hub 2 and the end portion of the magnetic tape 4 may be wound around the peripheral face of the tape supply-side hub 2. A flange is provide on the lower face side of one hub 2 and a flange is provided on the upper face side of the other hub 3, so that the wound posture of the magnetic tape 4 in the state of being wound onto each of the hubs 2 and 3 may be adjusted.

Although in the above embodiment, the adhesive agents 17 is applied to the peripheral face of the recording layer M2 to secure the magnetic tape 4, the adhesive agents 17 may be applied to the magnetic tape 4 so that the magnetic tape 4 is bonded to the hub 2. Moreover, it is possible to wind the magnetic tape 4 onto the tape supply-side hub 2 in the state that one surface of the magnetic tape 4 forming the non-recoding layer M1 is entirely coated with the adhesive agents so as to form the whole non-recoding layer M1 as one entity.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A tape cartridge for use as a backup medium for computer data, comprising a tape supply-side hub; a tape take-up-side hub; and a magnetic tape wound onto the tape supply-side hub that are disposed inside a mainframe case, wherein one end of a leader tape fixed onto the tape take-up-side hub and one end of the magnetic tape are connected via a splicing tape, the other end of the magnetic tape is wound onto the tape supply-side hub to establish direct connection between the magnetic tape and the tape supply-side hub, a wound tape layer wound onto the tape supply-side hub includes a non-recording layer on a winding leader side composed of a specified amount of a wound tape layer and a recording layer connecting to the non-recording layer, and a feeding limit position of the magnetic tape in the tape supply-side hub is set to be in a vicinity of a boundary between the non-recording layer and the recording layer.

2. The tape cartridge as defined in claim 1, wherein an end portion of the magnetic tape is bonded to a peripheral face of the tape supply-side hub through either water or adhesive agents.

3. The tape cartridge as defined in claim 1 or 2, wherein the non-recording layer is composed of an amount of the magnetic tape which allows a wound posture to be maintained by a friction resistance between adjacent tape faces.

* * * * *